United States Patent
Morganelli et al.

[11] Patent Number: 5,672,677
[45] Date of Patent: Sep. 30, 1997

[54] LONG OPEN TIME POLYAMIDE COMPOSITIONS

[75] Inventors: Paul L. Morganelli, Newmarket; Douglas E. Frost, Nottingham, both of N.H.

[73] Assignee: The Dexter Corporation, Seabrook, N.H.

[21] Appl. No.: 585,873

[22] Filed: Jan. 12, 1996

[51] Int. Cl.[6] .................... C08G 69/34; C08L 77/08
[52] U.S. Cl. .................. 528/339.3; 528/335; 528/338; 528/339; 528/347; 528/349; 526/935; 525/178; 525/184; 525/420.5; 524/600; 524/606; 524/607
[58] Field of Search ............... 526/935; 528/338, 528/339.3, 335, 339, 347, 349; 524/606, 600, 607; 525/420.5, 178, 189

[56] References Cited

U.S. PATENT DOCUMENTS

| | | | |
|---|---|---|---|
| 3,377,303 | 4/1968 | Peerman et al. | 508/339.3 |
| 3,444,026 | 5/1969 | Peerman | 528/339.3 |
| 4,218,351 | 8/1980 | Rasmussen | 528/326 |
| 4,328,331 | 5/1982 | Chen et al. | 528/425 |
| 4,485,233 | 11/1984 | Veazey | 528/295.3 |
| 4,740,528 | 4/1988 | Garvey et al. | 521/128 |
| 4,760,125 | 7/1988 | Wiemers et al. | 528/336 |
| 4,853,460 | 8/1989 | Harman | 528/339.3 |
| 4,882,414 | 11/1989 | Wroczynski | 528/339.3 |
| 4,882,474 | 11/1989 | Wroczynski | 528/339.3 |
| 4,914,162 | 4/1990 | Leoni et al. | 528/339.3 |
| 4,985,534 | 1/1991 | Heinz et al. | 528/272 |
| 5,296,557 | 3/1994 | Frihart | 525/423 |
| 5,321,120 | 6/1994 | Sommerfeld | 528/349 |
| 5,324,812 | 6/1994 | Speranza et al. | 528/335 |

*Primary Examiner*—Samuel A. Acquah
*Assistant Examiner*—P. Hampton-Hightower
*Attorney, Agent, or Firm*—Pearne, Gordon, McCoy & Granger LLP

[57] ABSTRACT

A polyamide hot melt adhesive is provided. It comprises the polyamide condensation product of substantially equivalent quantities of (a) an acid component consisting essentially of one or more polymeric fatty acids and one or more dicarboxylic acids and (b) an amine component consisting essentially of (i) two or more non-cyclic aliphatic diamines and (ii) one or more amine-terminated polyglycol diamines. The amine component is substantially free of piperazine-containing polyamines. The adhesive has an open time of at least 120 seconds. Preferred non-cyclic aliphatic diamines are ethylenediamine and 1,6-diaminohexane, preferably present in about equimolar amounts. The composition may further comprise an aromatic sulfonamide plasticizer. The adhesive is particularly useful for spraying applications.

20 Claims, No Drawings

LONG OPEN TIME POLYAMIDE COMPOSITIONS

BACKGROUND OF THE INVENTION

This invention relates generally to polyamide compositions and more particularly to polyamide hot melt adhesives having long open times.

DESCRIPTION OF RELATED ART

An important property of hot melt adhesives is their "open time" or "open assembly time". Open time, generally speaking, is the amount of time, after the hot melt adhesive is applied onto a first substrate, that the adhesive is still capable of creating an effective bond to a second substrate. The amount of open time a particular hot melt demonstrates depends generally on its temperature of application, rate of cooling, rate of crystallization, and the amount of crystallization that will ultimately occur.

The amount of open time desired varies from application to application. Packaging applications generally require fast setting adhesives having open times of typically 5–15 seconds. Assembly of large parts (such as furniture or bonding fabric to office partitions) generally requires longer open times in order to have enough time to dispense the adhesive over long lengths or large surface areas. Frequently such adhesives are applied to large areas by spraying; there is a particular need for hot melt adhesives having long open times for spraying applications, because spraying forcibly mixes air with the adhesive, tending to cool it more quickly and thus reduce the open time. Polyamides with open times up to 24 hours have been claimed, but these have low softening points and poor heat resistance.

In general, there is a need for polyamide hot melt adhesives having open times of at least 2 minutes and heat resistance over 180° F. Environmental concerns restricting the use of solvent-based aerosol adhesives further fuel the need for the invented hot melt adhesives. U.S. Pat. No. 4,853,460, the contents of which are hereby incorporated by reference, discusses the need for long open time polyamide hot melts and suggests certain compositions. The contents of U.S. Pat. No. 4,882,414, dealing with polyamide hot melts, are also hereby incorporated by reference.

SUMMARY OF THE INVENTION

A polyamide hot melt adhesive composition is provided which comprises the polyamide condensation product of substantially equivalent quantities of (a) an acid component comprising one or more polymeric fatty acids and one or more dicarboxylic acids and (b) an amine component comprising (i) two or more non-cyclic aliphatic diamines and (ii) one or more amine-terminated polyglycol diamines. The amine component is substantially free of piperazine-containing polyamines. The composition has an open time of at least 120 seconds.

DETAILED DESCRIPTION OF THE PREFERRED EMBODIMENTS OF THE INVENTION

Most of the components of the polyamide compositions of this invention are known in the art. The polymeric fatty acids, sometimes referred to in the art as "dimer acids", are complex mixtures resulting from the polymerization of fatty acids; they provide flexibility, suitable viscosity, adhesion and other properties to the adhesive. Representative of polymeric fatty acids are those commercially available from the polymerization of tall oil fatty acids. Those polymeric fatty acids which are based on $C_{18}$ fatty acids have a typical composition of 0–10 weight percent $C_{18}$ monobasic acids (monomer), 60–95 weight percent $C_{36}$ dibasic acids (dimer), and 1–35 weight percent $C_{54}$ tribasic acids (trimer) and higher polybasic acids. Preferred polymeric fatty acids are Hystrene 3695 and Hystrene 3680 (available from Witco Corp.), which are predominantly $C_{36}$ dimer. Less preferred are other polymeric fatty acids based on $C_{14}$–$C_{24}$ monomer monobasic fatty acids. Others may also be suitable. Preferably the dimer content of the polymeric fatty acid is at least 70%, more preferably at least 80%, more preferably at least 95%, by weight.

The dicarboxylic acids used in the invention include aliphatic, cycloaliphatic and aromatic dicarboxylic acids, preferably linear aliphatic, preferably saturated aliphatic. These acids add toughness, increased melting range and other properties to the adhesive. Representative of such acids, preferably containing from 2 to 22 carbon atoms, are oxalic, glutaric, malonic, adipic, succinic, azelaic, sebacic, dodecanedioic, suberic, and pimelic. Preferred dicarboxylic acids employed in this invention are straight chain saturated aliphatic diacids having at least 6 carbon atoms and, more preferably, 6 to 12 carbon atoms, such as azelaic and sebacic acids and industrial grade azelaic acid (which contains up to about 20 weight percent homologs of azelaic acid), which are most preferred. It should be understood that use of the corresponding acid anhydrides, esters and acid chlorides of these acids is included in the term "dicarboxylic acid."

The ratio of equivalents polymeric fatty acid to equivalents dicarboxylic acid in the acid component is preferably within the range of about 20:80 to 80:20, more preferably about 30:70 to 70:30, more preferably about 40:60 to 60:40. The acid component is preferably 20–80, more preferably 30–70, more preferably 40–60, equivalent % polymeric fatty acid, and preferably 20–80, g more preferably 30–70, more preferably 40–60, equivalent % dicarboxylic acid.

The invention includes the addition of two or more different non-cyclic aliphatic diamines. These non-cyclic aliphatic diamines should have 2–8, more preferably 2–6, carbon atoms; ethylenediamine, 1,3-diaminopropane, 1,4-diaminobutane, 1,5-diaminopentane, 2-methyl-1,5-diaminopentane, and 1,6-diaminohexane (HMDA) are preferred. The two or more non-cyclic aliphatic diamines are preferably present in about equimolar amounts, less preferably present in molar ratios of about 45:55 to about 55:45, less preferably about 2:3 to about 3:2, less preferably about 1:2 to about 2:1, less preferably about 1:3 to about 3:1, among themselves.

As used in the specification and claims, an amine-terminated polyglycol diamine is a molecule having the formula:

where n represents a number preferably from 1 to 7, more preferably from 1 to 5, and where $R_1$, $R_2$ and $R_3$, which may be the same or different, represent a linear or branched divalent aliphatic hydrocarbon having from 1 to 4, more preferably 2 to 3, carbon atoms, preferably branched 3 carbon. The preferred amine-terminated polyglycol diamines are JEFFAMINE D-230 and D-400, available from Huntsman Corp., which are represented by the following general formula where x is approximately 2.6 (for D-230) and approx. 5.6 (for D-400):

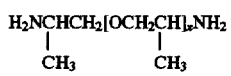

JEFFAMINE D-230 and D-400 have average molecular weights of about 230 and 400, respectively. Preferably the amine-terminated polyglycol diamines have molecular weights less than 2100, more preferably less than 1000, more preferably less than 470, more preferably less than 410.

The molar ratio of non-cyclic aliphatic diamines to amine-terminated polyglycol diamine in the amine component is preferably about 10:1 to about 2:1 or 1:1, more preferably about 6:1 to about 3:1, more preferably about 4:1. Thus where there is a first non-cyclic aliphatic diamine, a second non-cyclic aliphatic diamine, and an amine-terminated polyglycol diamine, the preferred molar ratio among the three is about 2:2:1, respectively. The amine component is preferably 50–96, more preferably 50–91, more preferably 75–86, more preferably about 80, equivalent % non-cyclic aliphatic diamine and preferably 4–50, more preferably 9–50, more preferably 14–25, more preferably about 20, equivalent % amine-terminated polyglycol diamine.

A further preferred embodiment of the invention includes one or more plasticizers selected from the group consisting of aromatic sulfonamides, preferably N-butylbenzene sulfonamide; o, p-toluene sulfonamide; and p-toluene sulfonamide; available as Uniplex 214, 171, and 173, respectively, from Unitex Chemical Corp. N-butylbenzene sulfonamide is preferred. These plasticizers are added at levels of preferably 0.1–15, more preferably 1–10, more preferably about 1–5, weight percent. In some tests of the invention, the addition of 3 weight percent N-butylbenzene sulfonamide surprisingly more than doubled the open time (up to 17–20 minutes) with heat resistance up to 200° F. Alternatively, the invention may be prepared without plasticizer, as in the Examples hereinafter.

As known in the art and as used in the specification and claims, equivalents or equivalent quantities means equivalent in terms of the number of functional groups present, in the present case the functional groups being the acid and amine groups. The present invention provides a polyamide condensation product of substantially equivalent quantities of an acid component and an amine component, which is defined to include and permit an excess of acid or amine effective to control melt viscosity, a procedure known in the art. Typically an excess of up to 5 or 8 equivalent %, preferably 1–3 equivalent % of acid or amine, as known in the art, is effective to control melt viscosity. As known in the art, small amounts (typically 0.5 to 10 equivalent %) of a saturated linear carboxylic acid containing 5–20 carbons, such as palmitic, or preferably stearic, acid, may optionally be added to control melt viscosity, but such components do not materially affect the basic and novel characteristics of the invention and the invention is preferably free from such components.

Other additives known in the art may optionally be added, such as defoaming agents, antioxidants, fillers, reinforcing agents, coupling agents, colorants, odorants, resins, tackifiers, plasticizers known in the art, stabilizers, antistats and others.

It is believed the long open times of the invention are achieved at least in part because the addition of at least a second non-cyclic aliphatic diamine and the addition of the polyglycol diamine reduces the ability of the first non-cyclic aliphatic diamine to crystallize and/or hydrogen bond, although this understanding may not be correct.

The invented compositions are (a) free or substantially free of piperazine-containing polyamines, which is defined to include such compounds as piperazine and piperazine and piperadine derivatives such as dipiperidylpropane and 1,3-di-(1-piperazinyl) propane, and (b) free or substantially free of other cyclic aliphatic polyamines and aromatic polyamines, as these components (1) do not contribute to, or (2) detract from, the long open time benefits of the invention.

The techniques and general method of polymerizing the mixed reactants is generally well known. In general, the polyamides of this invention may be prepared by charging a resin kettle with the reactants, in the proportions described herein, and heating the mixture to a temperature at which random polymerization begins, about 130°–160° C., and thereafter heating to higher temperatures sufficient to distill off the water of condensation and complete the reaction. Vacuum may be used to remove final traces of water. Preferably, the heating is carried out under an inert atmosphere such as nitrogen gas. To assist the polymerization, a polymerization catalyst such as phosphoric or hypophosphorus acid may optionally be added in a catalytic proportion. The heating of the reaction mixture is carried out until the desired melt viscosity is reached and the reaction is completed, with melt viscosities being measured and acid and amine values being determined and any necessary adjustments being made, as is known in the art.

The invented polyamide hot melt adhesives may be used to bond both rigid or flexible, natural or synthetic materials. They may be employed to adhere leather, suede, and both woven and non-woven fabrics obtained from natural and synthetic fibers such as cotton, wool, silk, sisal, hemp, jute, rayon, nylon, acrylics, polyesters, polyolefins and the like. They are also useful with polyurethane, neoprene foam, ABS and other polymeric materials. They are also useful for bonding rigid materials such as metals, aluminum, steel, wood, paper products, phenolics, cork, pressed board and the like, and for bonding other materials known in the art.

The invented polyamide hot melts are applied using conventional hot melt application procedures such as printing, dipping, spreading, rolling, applying as a bead, and preferably spraying, since long open times are particularly necessary for many spraying applications.

Open time, as used in the specification and claims, means open time as determined according to ASTM D4497. The invented compositions have open times of at least 2, more preferably at least 3, more preferably at least 5, more preferably at least 6, minutes, and in different applications have preferred open times of at least 8, 10, 12, 14, 16 and 18 minutes.

Heat resistance, as used in the specification and claims, means heat resistance as determined according to ASTM D4498 with a 2 psi load. The invented compositions have heat resistance of preferably at least 180° F., more preferably at least 190° F., more preferably at least 200° F., more preferably about 205°–210° F., and in some applications 220° F., 230° F., and higher. Heat resistance is needed so the adhesive in use may withstand high ambient temperatures, such as in an automobile or factory or during shipment.

Melt viscosity, as used in the specification and claims, means melt viscosity as determined according to ASTM D3236 at 350° F. (except that Example 6 is at 400° F.). The invented compositions have melt viscosities of preferably less than 15,000 cP (centipoise), more preferably less than 10,000 cP, more preferably less than 7,000 cP, more preferably less than 5,000 cP, preferably about 1,000–5,000 cP and in some applications about 1,000–3,000 cP; these melt viscosities are preferred so the adhesive may be dispensed rapidly by automatic equipment.

Shore A hardness, as used in the specification and claims, means Shore A hardness as determined according to ASTM D2240. The invented compositions have Shore A hardnesses of preferably at least 55, more preferably at least 60, more preferably at least 65, more preferably at least 70; these hardnesses are preferred so the adhesive may be used as a shaped adhesive such as a glue stick in a glue gun.

The invention is further illustrated in the following Examples.

EXAMPLES 1–11

In Examples 1–11, polyamide hot melt adhesive compositions were prepared with the components listed using procedures generally described above. The reactants are listed by equivalent percents of total reactants, i.e., 19.3 equivalent percent of ethylenediamine means 19.3 percent of the total acid and amine groups of all reactants before polymerization are derived from the amine groups of the ethylenediamine. The polymeric fatty acid is a 50/50 blend of Hystrene 3680 and 3695. Jeffamine D2000 is like Jeffamine D400, except it has a MW of about 2000. The softening points (° F.) are according to ASTM E28.

| Example | 1 | 2 | 3 | 4 | 5 | 6 | 7 | 8 | 9 | 10 | 11 |
|---|---|---|---|---|---|---|---|---|---|---|---|
| Reactant | | | | | | | | | | | |
| Polymeric Fatty Acid | 28.5 | 28.5 | 28.5 | 28.5 | 28.5 | 28.5 | 28.5 | 28.6 | 28.4 | 28.5 | 28.3 |
| Azelaic Acid | 22.5 | 22.5 | 22.5 | 22.5 | 22.5 | 22.5 | 22.5 | 22.6 | 22.5 | 22.5 | 22.4 |
| Jeffamine D400 | 9.7 | 9.7 | 9.7 | 9.7 | 9.7 | 9.7 | 9.7 | 9.7 | — | 4.8 | — |
| Ethylenediamine | 19.3 | 19.3 | 19.3 | 19.3 | 19.3 | 39.3 | 12.3 | 30.1 | 24.3 | 21.8 | 23.3 |
| 1,3-diaminopropane | 20.0 | — | — | — | — | — | — | — | — | — | — |
| 1,4-diaminobutane | — | 20.0 | — | — | — | — | — | — | — | — | — |
| 2-methyl-1,5-diaminopentane | — | — | 20.0 | — | — | — | — | — | — | — | — |
| 1,6-diaminohexane | — | — | — | 20.0 | — | — | 27.0 | 9.0 | 24.8 | 22.4 | 23.9 |
| Piperazine | — | — | — | — | 20.0 | — | — | — | — | — | — |
| Jeffamine D2000 | — | — | — | — | — | — | — | — | — | — | 2.1 |
| Open Time (seconds) | 115 | 390 | 220 | 390 | 105 | 13 | 270 | 70 | 50 | 135 | 180 |
| Heat Resistance (°F.) | 205 | 211 | 168 | 215 | 220 | 320 | 219 | 315 | 246 | 243 | 236 |
| Melt Viscosity (cP) | 5500 | 5100 | 4800 | 5100 | 7000 | 1100 | 11000 | 3700 | 16500 | 9400 | 23800 |
| Softening Point (°F.) | 256 | 264 | 224 | 246 | 265 | 357 | 238 | 314 | 273 | 273 | 262 |
| Hardness (Shore A) | 76 | 80 | 67 | 78 | 75 | 94 | 73 | 82 | 94 | 89 | 94 |

Example 6 shows that a single non-cyclic aliphatic diamine generates a short open time. Examples 1–4 illustrate that when a second non-cyclic aliphatic diamine is added, the open time is much longer. Example 5 illustrates that when a cyclic aliphatic diamine, piperazine, is substituted for the second non-cyclic aliphatic diamine, the open time is much reduced, to less than two minutes. Examples 4, 7 and 8 show that approximately equimolar amounts of the two non-cyclic aliphatic diamines are preferred, although other ratios can be effective. Examples 4, 9 and 10 show that as the amount of Jeffamine D400 is increased, the open time increases. Examples 4 and 11 show that, at about the same weight ratio, Jeffamine D2000 is less effective than Jeffamine D400 in increasing open time.

Although the preferred embodiments of the invention have been shown and described, it should be understood that various modifications may be resorted to without departing from the scope of the invention as disclosed and claimed herein.

What is claimed is:

1. A polyamide hot melt adhesive composition comprising the polyamide condensation product of substantially equivalent quantities of (a) an acid component comprising one or more polymeric fatty acids and one or more dicarboxylic acids and (b) an amine component comprising (i) two or more non-cyclic alkyl diamines and (ii) one or more amine-terminated polyglycol diamines, said amine component being substantially free of piperazine-containing polyamines, said composition having an open time of at least 120 seconds.

2. A composition according to claim 1, further comprising a plasticizer selected from the group consisting of aromatic sulfonamides.

3. A composition according to claim 2, wherein said plasticizer is selected from the group consisting of N-butylbenzene sulfonamide, o,p-toluene sulfonamide, and p-toluene sulfonamide.

4. A composition according to claim 1, wherein each of said two or more non-cyclic alkyl diamines has 2 to 8 carbon atoms.

5. A composition according to claim 1, wherein each of said one or more amine-terminated polyglycol diamines has the formula

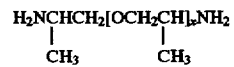

where x is from 2 to 7.

6. A composition according to claim 1, wherein said composition has a heat resistance of at least 180° F.

7. A composition according to claim 1, wherein said composition has a melt viscosity of less than 7000 cP.

8. A composition according to claim 1, wherein said composition has an open time of at least 300 seconds.

9. A composition according to claim 1, wherein said two or more non-cyclic alkyl diamines are present in molar ratios of about 2:3 to about 3:2 among themselves.

10. A composition according to claim 9, wherein said two or more non-cyclic alkyl diamines are present in about equimolar amounts.

11. A composition according to claim 5, wherein said two or more non-cyclic alkyl diamines consists of ethylenediamine and 1,6-diaminohexane, said ethylenediamine and said 1,6-diaminohexane being present in about equimolar amounts, and wherein the molar ratio between said ethylenediamine and said one or more amine-terminated polyglycol diamines is about 2:1.

12. A polyamide hot melt adhesive composition comprising the polyamide condensation product of substantially equivalent quantities of (a) an acid component consisting essentially of one or more polymeric fatty acids and one or more dicarboxylic acids and (b) an amine component consisting essentially of (i) two or more non-cyclic alkyl diamines and (ii) one or more amine-terminated polyglycol diamines, said composition having an open time of at least 120 seconds.

13. A composition according to claim 12, further comprising a plasticizer selected from the group consisting of aromatic sulfonamides.

14. A composition according to claim 13, wherein said plasticizer is selected from the group consisting of N-butylbenzene sulfonamide, o,p-toluene sulfonamide, and p-toluene sulfonamide.

15. A composition according to claim 12, wherein said amine component is substantially free of piperazine-containing polyamines.

16. A composition according to claim 12, wherein each of said one or more amine-terminated polyglycol diamines has the formula $$\underset{CH_3}{H_2NCHCH_2}[OCH_2\underset{CH_3}{CH}]_xNH_2$$

where x is from 2 to 7.

17. A composition according to claim 4, wherein each of said two or more non-cyclic alkyl diamines has 2 to 6 carbon atoms.

18. A composition according to claim 7, wherein said composition has a heat resistance of at least 200° F.

19. A composition according to claim 18, wherein said composition has an open time of at least 300 seconds.

20. A composition according to claim 4, wherein said two or more non-cyclic alkyl diamines are present in molar ratios of about 2:3 to about 3:2 among themselves.

* * * * *

UNITED STATES PATENT AND TRADEMARK OFFICE
CERTIFICATE OF CORRECTION

PATENT NO. : 5,672,677
DATED : September 30, 1997
INVENTOR(S) : Paul L. Morganelli, et al.

It is certified that error appears in the above-indentified patent and that said Letters Patent is hereby corrected as shown below:

Column 3, line 48, delete "equivalent % of" and insert therefore --equivalent %, of--.

Column 5, line 38, after "Open Time (seconds)" delete "115" and insert therefore --315--.

Signed and Sealed this

Seventeenth Day of February, 1998

Attest:

BRUCE LEHMAN

Attesting Officer

Commissioner of Patents and Trademarks